F. W. SMITH.
WIRE CHAIN.
APPLICATION FILED NOV. 7, 1919.

1,379,131.

Patented May 24, 1921.
2 SHEETS—SHEET 1.

Frederick W. Smith
INVENTOR:

BY Frederick S. Duncan
ATTORNEY

F. W. SMITH.
WIRE CHAIN.
APPLICATION FILED NOV. 7, 1919.
1,379,131.
Patented May 24, 1921.
2 SHEETS—SHEET 2.
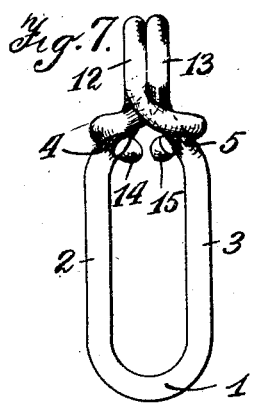
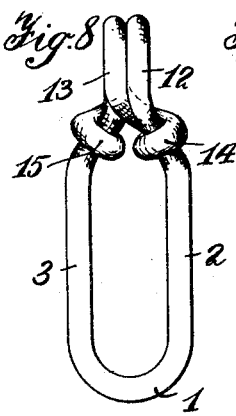
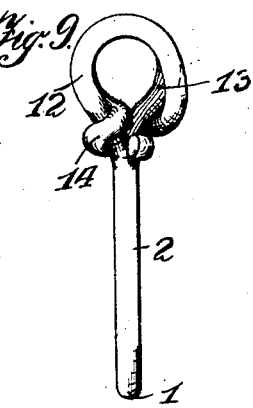
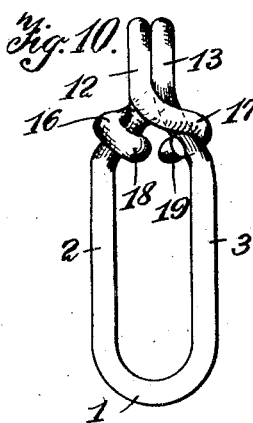
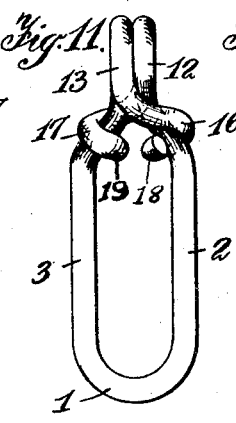
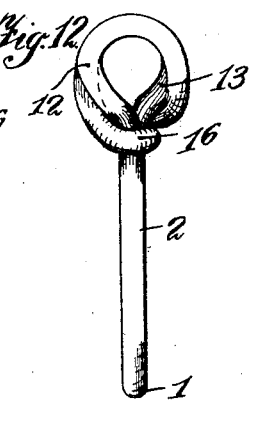
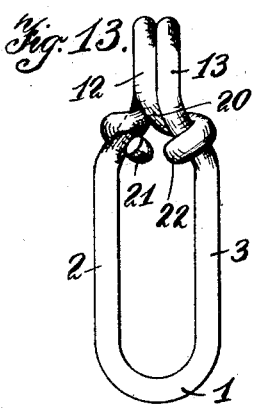
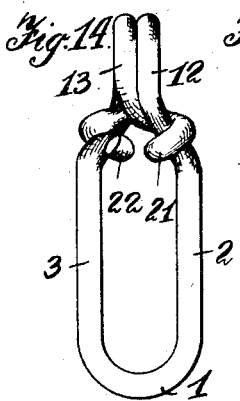
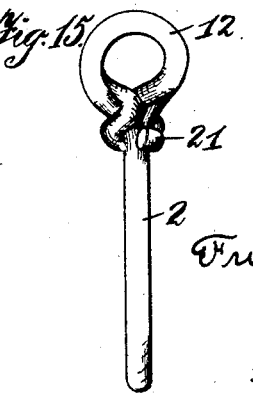
Friend W. Smith
INVENTOR:
By Frederick S. Duncan
ATTORNEY

UNITED STATES PATENT OFFICE.

FRIEND W. SMITH, OF BRIDGEPORT, CONNECTICUT, ASSIGNOR TO AMERICAN CHAIN COMPANY, A CORPORATION OF NEW YORK.

WIRE CHAIN.

1,379,131.     Specification of Letters Patent.     Patented May 24, 1921.

Application filed November 7, 1919. Serial No. 336,440.

*To all whom it may concern:*

Be it known that I, FRIEND W. SMITH, a citizen of the United States, residing at Bridgeport, in the State of Connecticut, have invented certain new and useful Improvements in Wire Chains, of which the following is a specification.

This invention pertains to wire chains and has for its principal object the production of a chain made up of links of the type comprising a loop portion and an eye portion, the loop frequently being in a plane at right angles to the plane of the eye. It has for a further object the production of a chain of the same general type wherein the eye portion of the link is composed of two strands of material located side by side and registering with each other, each component element being anchored to the opposite side of the loop in such manner as to prevent spreading or collapse of the eye and loop under stress. Furthermore, the eye is strong and there are no projecting ends which render the chain rough, so that it will not gather lint and waste. Still further, the construction is such that the chain may be readily employed as a sprocket chain.

While the chain is flexible, there is no pinching or binding of the interconnected loops and eyes and the loops will maintain their shape under all ordinary strains; that is to say, they will not spread or collapse, such action to a great extent being prevented by the anchorage of each eye to the opposite loop, as will hereinafter be set forth.

The invention is susceptible of various embodiments and several of them are illustrated in the drawings wherein:

Figs. 7 and 8 are views of opposite faces respectively of another modified form of link, and Fig. 9 is a side view of the same;

Figs. 10 and 11 are views of opposite faces respectively of still another modified form of link, and Fig. 12 is a side view of the same;

Figs. 13 and 14 are views of opposite faces respectively of still another modified form of link, and Fig. 15 is a side view of the same.

Figure 1:
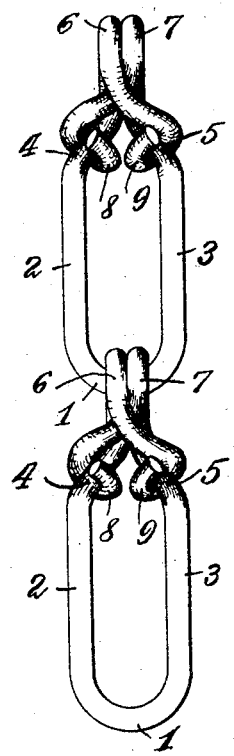
Figure 1 is a view of one face of two interconnected links of the preferred form of my invention.
Figure 2:
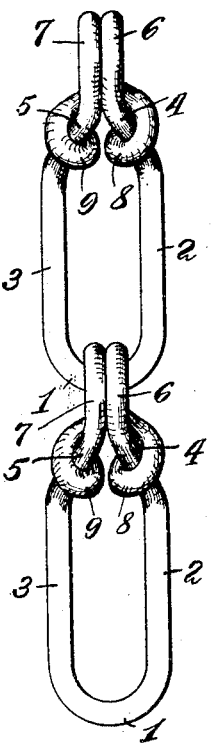
Fig. 2 is a view of the opposite face of the same.
Figure 3:
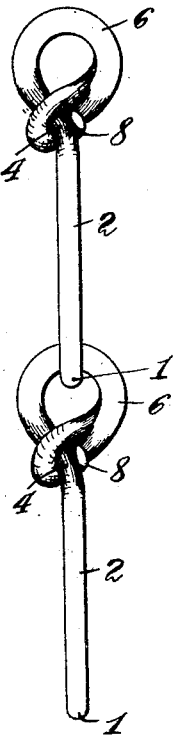
Fig. 3 is a side view of the two interconnected links shown in Figs. 1 and 2.
Figure 4:
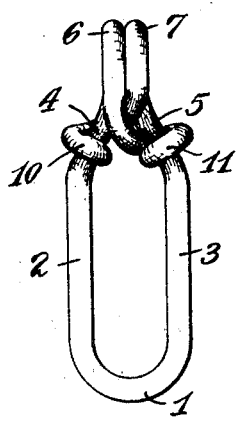
Figs. 4 and 5 are views of opposite faces respectively of a modified form of the link.
Figure 5:
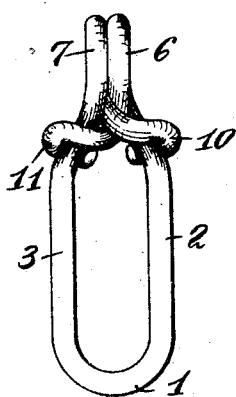
Figure 6:
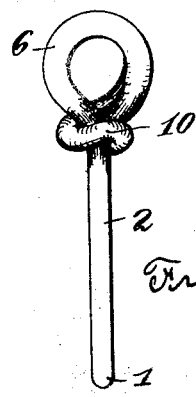
Fig. 6 is a side view of the same.

Referring first to Figs. 1 to 3, each link is formed from a blank consisting of a single section of wire. The blank is bent to the form shown, which comprises a bow or loop, preferably elongated in form, having an end or curved portion 1 and side strands 2 and 3, which are continued to form the eye as hereinafter described. In forming up the blank into a link, it is first bent centrally on itself to form the curved portion 1 with the strands approximately parallel with each other. Each strand is then continued inwardly with respect to the loop to form the shoulders 4 and 5, thence rearwardly, upwardly, forwardly and downwardly, following approximately the circumference of a circle to form an eye composed of the two registering elements 6 and 7 located side by side. As each strand reaches the base of the eye thus formed, it is continued to the side of the loop opposite to it and thence over the shoulder located in the said opposite side, and thence around the said shoulder whereby the anchoring hooks 8 and 9 are formed. The strands thus cross each other approximately at the base of the eye and each element of an eye is consequently anchored to the opposite strand, thus interlocking the two elements and preventing them and the strands of the loop from spreading. In the form shown in Figs. 4, 5 and 6, the construction is the same as that shown in Figs. 1, 2 and 3, except for the manner in which the ends of the strands are carried about the opposite shoulders of the loop to form the anchoring hooks. In this form, as in Figs. 1, 2 and 3, the blank is first bent centrally on itself and the two side strands are thence bent inwardly to form shoulders 4 and 5, and thence circularly to form eye elements 6 and 7. The ends of the strands from a point near the base of the eye are then carried to opposite sides respectively of the link as in the case of Figs. 1, 2 and 3, but instead of being first carried over the shoulders 4 and 5, are first carried under them and then over, thus forming the anchoring hooks 10 and 11. In other words, the form of Figs. 4, 5 and 6 differs from the form of Figs. 1, 2 and 3 only with respect to the manner of connecting the ends of the strands with the shoulders, which in the former case consists of bringing the strands under the shoulders before the hook is formed, while in the latter case the strands are brought over the shoulders before the hook is formed.

In Figs. 7, 8 and 9 the blank is, as in the previous cases, bent centrally on itself to form the curve 1 and the side strands 2 and 3. The side strands 2 and 3 are then continued into shoulders 4 and 5, and thence bent circularly to form an eye, but instead of both being first bent rearwardly to form the eye, one of them, for example the strand 2 is bent rearwardly, upwardly, forwardly and downwardly, while the other, 3, is bent forwardly, upwardly, rearwardly and downwardly. The end of the strand composing the eye element 13 is then continued across the link through the base of the eye, i. e. within its circle, to the opposite shoulder, over which it is turned to form the anchoring hook 14. The end of the eye element 12 is likewise continued across the link, but passes without the circle of the eye and thence over the shoulder 5 to form the anchoring hook 15.

In the case of the form shown in Figs. 10, 11 and 12, the strands are bent into the two component elements of the eye in the same manner as in the form shown in Figs. 7, 8 and 9, but neither strand 16 nor 17 is led through the base of the eye to the shoulder opposite. On the contrary both strands are led without the circle of the eye and obliquely to each other and over the opposite shoulders respectively, and thence around the opposite shoulders to form the anchoring hooks 18 and 19.

In the case of the form shown in Figs. 13, 14 and 15, the strands are bent into the same form as is shown in Figs. 7, 8 and 9, with the exception that both strands are carried through the base of the eye, that is, through its circle, crossing each other at 20 and thence over the opposite shoulders respectively to form the anchoring hooks 21 and 22.

In the case of all the forms, strain applied to the chain has a tendency to force or draw the component elements of the eyes together, a point of manifest advantage. Furthermore, as above indicated, the bows or loops of the chain links cannot be spread, nor will they elongate under normal strain, this by reason of the fact that the ends of the strands which form the component elements of the eye pass to the opposite side of the link and bind and tie each eye to the said opposite side.

It is obvious that in the practice of my invention modifications in detail may be followed and produced. I do not, therefore, wish to be limited to the details above set forth, but what I wish to secure is set forth in the following claims:

1. A wire chain, each link of which consists of a loop and an eye, the eye consisting of two component elements which are each formed from a continuation of the strands of the loop on the side of the link on which they are respectively situated and the terminal strand of each eye crossing the other near the base thereof and being anchored to the opposite strand of the loop.

2. A wire chain, each link of which consists of a loop and an eye that are disposed at approximately right angles to each other, the eye consisting of two component elements the terminal of each of said elements crossing to the side of the link opposite thereto and being anchored to said side.

3. A chain, each link of which consists of a loop portion and eye portions formed from a single section of wire, the strands of the eye portions crossing each other and being anchored to the side strands of the link respectively opposite thereto.

4. A chain each link of which consists of a loop portion and eye portions formed from a single section of wire the loop and eye portion being disposed in planes substantially at right angles to each other, the strands of the eye portion being curved in substantially annular form, each in a direction the reverse of the other and then crossing each other, each strand then being turned about the strand of the loop opposite the eye portion from which it proceeds.

5. A chain link formed from a single section of wire and comprising a loop portion and two eye portions, each eye portion being anchored to the strand of the loop opposite it by a hook formed from a continuation of said eye portion carried across the link.

6. A chain link formed from a single section of wire bent centrally on itself to form a loop, the side strand of said loop being continued to form eye portions and thence continuing each to the opposite side of the link and anchored to said opposite side.

In testimony whereof, I have signed this specification.

FRIEND W. SMITH.